United States Patent [19]
McKague, Jr. et al.

[11] Patent Number: 5,795,094
[45] Date of Patent: Aug. 18, 1998

[54] COMPOSITE METALLIC TENSION FITTING

[75] Inventors: Elbert Lee McKague, Jr.; Ronald Kendall Cox; John Edward Phillips, all of Fort Worth, Tex.

[73] Assignee: Lockheed Martin Corporation, Fort Worth, Tex.

[21] Appl. No.: 752,323

[22] Filed: Nov. 19, 1996

[51] Int. Cl.⁶ .................................................. F16B 5/12
[52] U.S. Cl. ........................ 403/335; 403/375; 403/404
[58] Field of Search ........................... 403/179, 50, 51, 403/273, 275, 332, 404, 375, 267, 266, 265, 335, 338, 185, 186, 387; 156/222, 285; 428/57, 43

[56] References Cited

U.S. PATENT DOCUMENTS

| | | | |
|---|---|---|---|
| 3,303,255 | 2/1967 | Bracey, Jr. | 156/222 X |
| 3,368,835 | 2/1968 | Hackforth | 403/50 |
| 3,414,305 | 12/1968 | Monogue | 403/179 |
| 3,472,540 | 10/1969 | Gottschaud | 403/51 |
| 4,038,119 | 7/1977 | Lambert | 156/222 X |
| 4,275,122 | 6/1981 | Fisher | 403/265 X |
| 4,556,592 | 12/1985 | Bannink, Jr. | 403/267 X |
| 4,572,693 | 2/1986 | Nemoto | 403/50 X |
| 5,201,500 | 4/1993 | Ecktman et al. | 403/50 X |
| 5,553,964 | 9/1996 | Rouillot | 403/404 X |

*Primary Examiner*—Harry C. Kim
*Attorney, Agent, or Firm*—James E. Bradley

[57] ABSTRACT

A composite structural member having an improved joint for securing loads thereto is formed from a body of composite sheet material. A loading member having an outer periphery and being configured to secure loads thereto is provided with an undercut portion or recess located along the outer periphery. The composite sheet material overlays the loading member about the outer periphery and has a lip formed from the sheet material which projects into and engages the undercut portion of the outer periphery. A retaining tension band is wrapped around the outer periphery of the loading member and the lip and maintains the lip in engagement with the undercut portion of the loading member so that the loading member is securely held in place relative to the sheet material when loads are applied to the loading member.

24 Claims, 2 Drawing Sheets

COMPOSITE METALLIC TENSION FITTING

BACKGROUND OF THE INVENTION

1. Field of the Invention:

This invention relates to composite structural members and joints used thereon for applying loads to such members, and in particular, to joints for use on such structural members for securing loads thereto without necessitating the penetration of the composite sheet material of the structural member with fasteners, such as bolts, screws or rivets.

2. Description of the Prior Art

Composite materials, such as graphite/epoxy and fiberglass, are particularly well suited for in-plane tension load applications. Specific strengths and stiffnesses of composites exceed metals in some cases. Although composite materials, such as resin/fiberglass materials, are excellent in tension (in-plane), these materials are not able to withstand large bearing, interlaminar shear or interlaminar tension stresses. Failure as a result of the interlaminar (3D) stresses limits the ways in which these composite materials can be fastened together or otherwise secured to handle out-of-plane loads. For this reason, metal fittings are combined with the composite material in order to maximize the joint's load-carrying capability.

In other words, while composite materials are excellent in handling in-plane loads, they are weak in taking out-of-plane loads and bolt-bearing loads. This can best be illustrated with reference to FIG. 1 which shows a prior art tension fitting 10. The tension fitting 10 is shown here as a "box beam" or "C-stiffener" of the type commonly used on composite beams in a variety of applications. As can be seen, holes 12 are formed in the composite portion of the tension fitting 10 such as by punching or drilling. While composite material of the fitting 10 has high strength in tension, there are stress concentrations created by the holes 12 (either bearing or bypass tension) that result in a reduction of the joint's overall strength.

A metal clip 14 or end plate is secured to the tension fitting 10 by means of bolts or fasteners 16 which project through the holes 12. When load is applied to the metal clip 14, it is also applied to the edges of the holes 12 formed in the composite material of the fitting 10 by the fasteners 16. The shear loads transferred by the fasteners 16 to the fitting produce highly concentrated bearing stresses in these areas, resulting in lower load-carrying capabilities and failure of the tension fitting.

Another disadvantage of the prior art methods of combining composite materials with metal fittings is the necessity for providing additional metal fasteners, such as the fasteners 16. This adds additional weight to the fitting which is undesirable, especially in aviation applications. For instance, C-stiffeners, such as that shown in FIG. 1, may have many bolts or other fasteners in order to distribute the shear loads to the composite material of the tension fitting. Although this weight may be insignificant for each fitting, the total number of fittings required on a typical aircraft, for example, would result in a significant weight factor.

What is needed is a composite structural member or system having means for handling the structural loads without forming holes or penetrating the composite material with fasteners which weaken the composite material and result in undesirable shear loads being applied to the composite material while creating additional weight.

SUMMARY OF THE INVENTION

A composite structural member formed from composite sheet material having a joint for securing loads thereto without necessitating the penetration of the composite sheet material with fasteners, such as bolts, screws or rivets, is formed by providing a loading member configured to secure loads thereto. The loading member has an outer periphery with an undercut portion or recess, such as a groove, formed therein. The composite sheet material overlays the loading member about the outer periphery. A lip formed from a portion of the composite sheet material projects into and engages the undercut portion of the outer periphery of the loading member. A retaining tension band may be wrapped around the outer periphery of the loading member and the lip. The band, which may be formed from a plurality of collimated windings or fibers maintains the lip in engagement with the undercut portion of the loading member so that the loading member is securely held in place relative to the sheet material when loads are applied to the loading member.

DETAILED DESCRIPTION OF THE INVENTION

Figure 1:
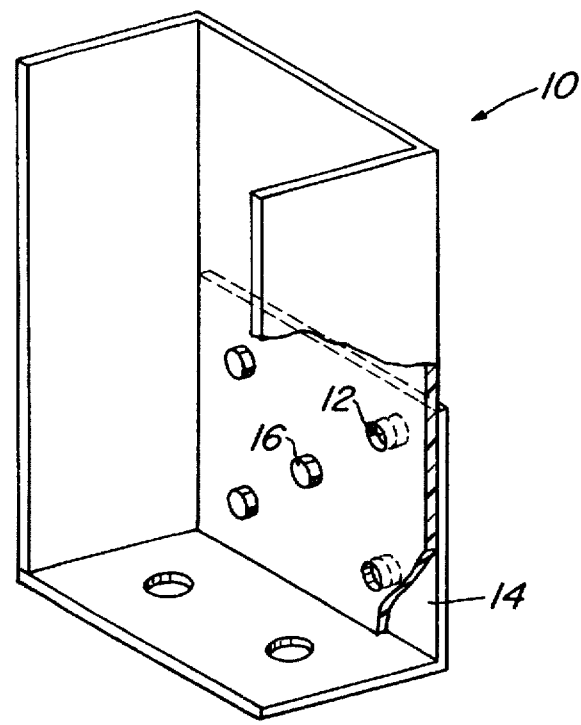
FIG. 1 is a partially sectioned, perspective view of a prior art tension fitting showing a metal fixture fastened to composite material by means of conventional fasteners.
Figure 2:
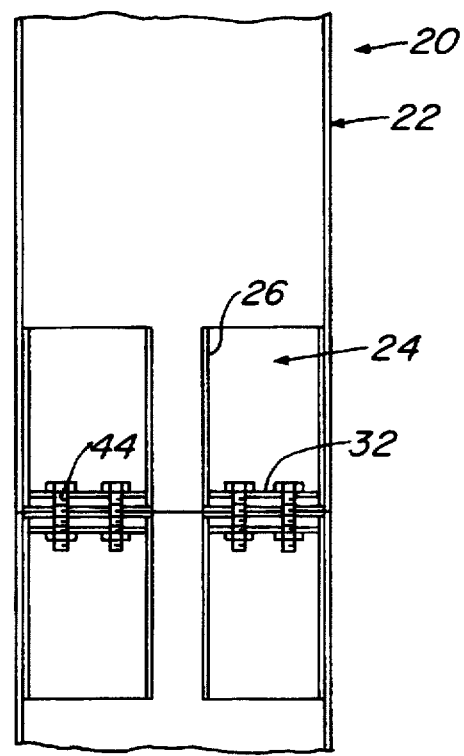
FIG. 2 is a front elevational view of a composite beam shown with composite tension fittings used for securing the beam to a similar, second beam, and constructed in accordance with the invention.

Referring to FIG. 2, a portion of a bulkhead 20, such as those used in aircraft, is shown. The bulkhead 20 is formed from composite materials, such as resin impregnated graphite, fiberglass, carbon or aramid fibers. The portion shown consists of two generally similar upright box-type beams 22 which abut one another and are joined together end to end. The upright beams 22 are formed from composite material and, as can be seen more clearly in FIG. 3, have a C-shaped cross section formed from opposite parallel side walls which are joined together by a single, continuous rear wall.

Figure 3:
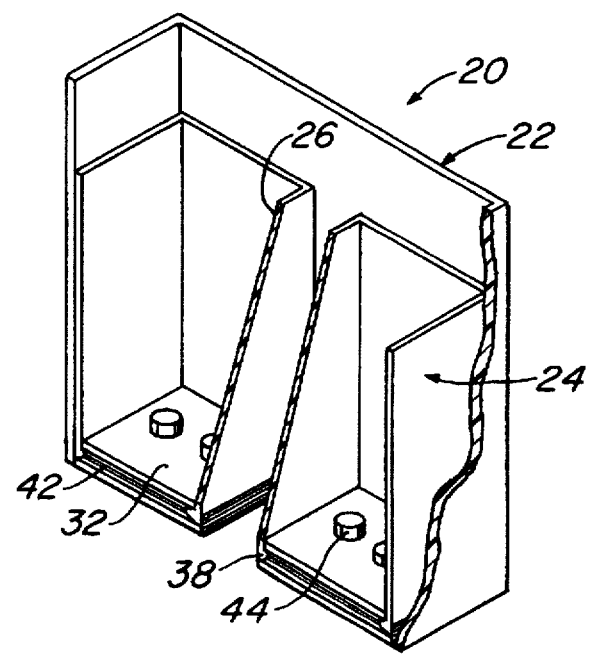
FIG. 3 is a perspective view showing the composite tension fittings of FIG. 2.

Located at the ends of each of the box beams 22 are a pair of tension fittings or C-stiffeners 24. The fittings 24 have sidewalls of composite material, and are integrally joined to the interior of the box beam 22 in a side-by-side position as shown in FIGS. 2 and 3. The C-stiffeners 24 also have a box or C-shaped configuration like that of the beam 22. The composite structural members of the invention, however, should not be limited to any particular size, shape or configuration. For instance, while the C-stiffeners are open along one side in FIGS. 2 and 3, they may also be tubular or enclosed on all sides.

The walls 26 of each tension fitting 24 are formed from layers of resin-impregnated fiber composite material. The individual layers of composite are more clearly shown in FIG. 5. Located at one end of the tension fitting 24 is a metal end cap of plate 32 which serves as a load bearing member.

The metal end cap 32 is a flat plate provided with an annular groove 34 which extends along the entire outer periphery or edge of the end cap 32. The end cap 32 can be formed from any type of metal or other structurally sound material which is capable of withstanding high shear, bearing, and bending loads. Holes 36 may be formed in the end cap 32 for receiving fasteners, such as bolts, screws, or rivets.

Figure 4:
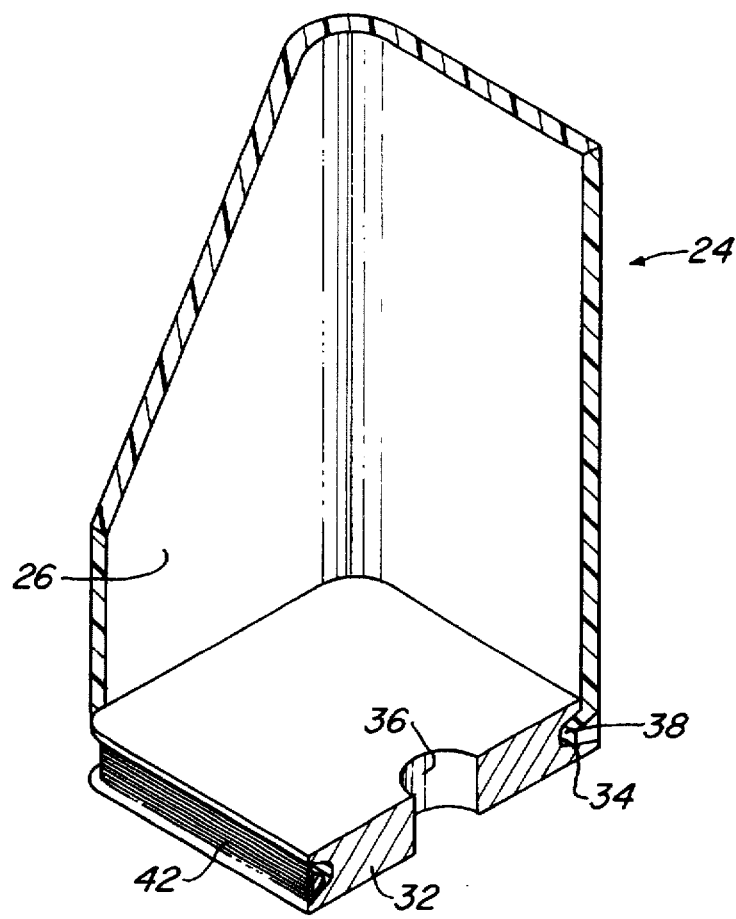
FIG. 4 is a perspective view of a partially sectioned tension fitting showing an endplate secured to the composite material of the tension fitting and constructed in accordance with the invention.
Figure 5:
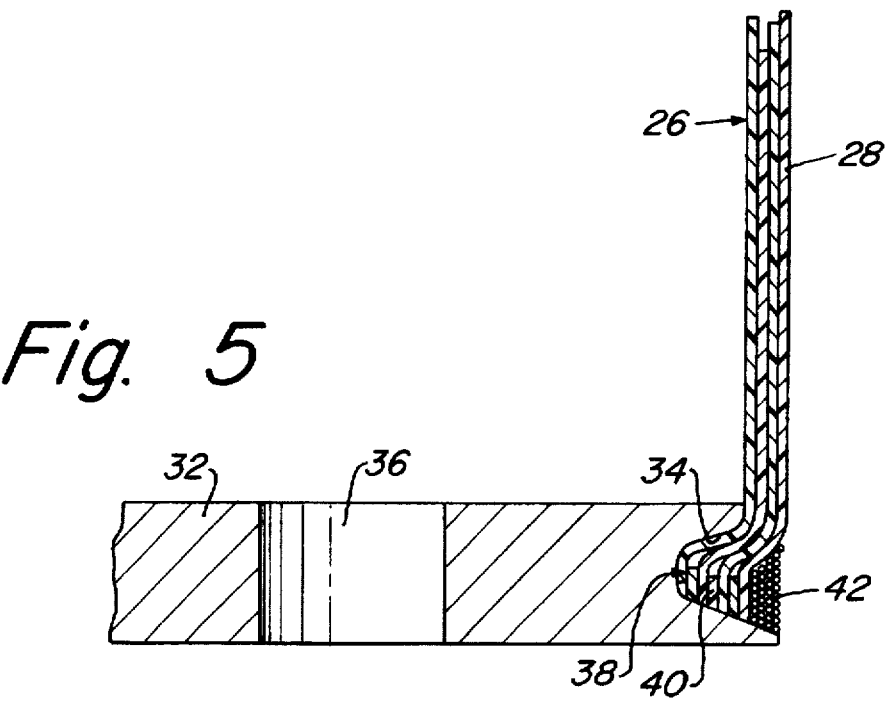
FIG. 5 is an elevational view of the endplate of FIG. 4 showing the construction of a lip which projects into a recess of the endplate constructed in accordance with the invention.

As can be seen in FIG. 4, and more clearly in FIG. 5, the side walls 26 of the fitting 24 are provided with a lip 38 or area of increased thickness which projects inward into the groove 34 of the end cap 32. The lip 38 is formed from the individual composite material layers 28 being pressed into the groove 34 of the end cap 32 prior to curing of the composite material. Spacer strips 40, also formed from lengths of resin impregnated fiberglass, are interspaced between the layers 28 forming the sidewalls 26. This gives the composite sheet material forming the side walls of the C-stiffener 24 a much greater thickness at the area forming the lip 38. Although not shown, adhesive may be applied to the groove 34 and lip 38 to further secure the lip 38 within the groove 34. However, it has been found that adhesive is not necessary in order to adequately join the composite material to the loading member or end cap 32 using the construction as described herein.

Surrounding the outer periphery of the end cap 32 and the lip 38 is a retaining tension band 42 formed from a plurality of collimated windings. These are preferably high-strength composite strands, such as fiberglass fibers, wrapped tightly to create a tension band that restrains movement of the load bearing member 32 when loads are transferred from the composite materials forming the C-stiffener 24 to the metal fitting 32 and vice versa.

The fitting 24 is formed by first forming uncured resin impregnated fiber composite layers into the desired shape for the tension fitting or structural member. During the layup of the composite sheet material, the spacer strips 40 can be positioned between each of the layers as shown in FIG. 5. The uncured sheet material is easily formed so that the lip 38 be forced into the groove 34 of end cap 32. Next, windings 42 of fiberglass, graphite, carbon, or aramid fibers, are wrapped about the lip 38 and the groove 32 of the end cap 32 so that the lip 38 is securely locked in place within the groove 34. The windings 42 may be coated with resin also so that the whole fitting may be eventually cured to form a rigid structural member. As previously discussed, adhesive may also be applied within the groove 32 to facilitate bonding of the lip 38 within the groove 34. In the particular embodiment shown, the tension fittings 24 are then bonded to the upright beams 22 so that the beams 22 can be secured together.

In operation, the composite laminate buildup in the lip 38 caused by the interleafing of the spacers 40 creates a wedge. Pressed and cured into the groove 34 of the load bearing member or end cap 32, this wedge causes loads to be applied to or from the load bearing member 32 to the walls 26 of the composite member 24, or vice versa, by mechanical locking of the lip 38 within the groove 34 so that force exerted on the sheet material form in the side walls 26 is of an interlaminar shear-type loading.

The structural member and joint used thereon is a vast improvement over the prior art methods which utilize fasteners that physically penetrate the composite material forming the side walls. With the structural member of the invention, there is no need to form or drill holes in the composite material in order to attach the fasteners. The result is that there are no stress concentrations (bearing or bypass tension) due to the presence of holes in the composite sheet material. Further, there are no concentrated shear loads from bolts or fasteners applied to the composite material. The fact that there is no need for additional fasteners also results in an overall weight reduction in the composite fitting. As shown in FIG. 2, the only bolts necessary in joining end to end beams are the bolts 44 which pass through the metal end plates 32. This is a great benefit because of the poor bolt-bearing capacity of most composite sheet materials.

While the invention has been shown in only one of its forms, it should be apparent to those skilled in the art that it is not so limited but that it is susceptible to various changes without departing from the scope of the invention. For instance, the above description was directed toward a tension fitting bonded to a composite beam. It should be apparent that the beam itself could be formed in a similar manner without necessitating the use of separate C-stiffeners or tension fittings bonded thereto. The joint of the invention has application in a variety of areas where fiberglass or composite structural members must be mechanically joined to other structures of the same or different materials.

We claim:

1. A composite structural member comprising:

a rigid structural body formed from composite sheet material;

a loading member having an outer periphery and being configured for applying loads thereto, the composite sheet material overlaying the loading member about the outer periphery, and wherein the outer periphery of the loading member has an undercut portion formed therein; and a lip formed from a portion of the composite sheet material which projects into and engages the undercut portion of the outer periphery of the loading member so that the loading member is securely held in place relative to the sheet material when loads are applied to the loading member so that the loads are transferred through the loading member to the sheet material.

2. The structural member of claim 1, further comprising:

a retaining band which is wrapped about the outer periphery of the loading member and the lip so that the band facilitates maintaining the lip in engagement with the undercut portion of the loading member.

3. The structural member of claim 2, wherein:

the retaining band is formed from a plurality of non-metallic collimated windings.

4. The structural member of claim 3, wherein:

the windings are selected from a group consisting of fiberglass fibers, graphite fibers, carbon fibers and aramid fibers.

5. The structural member of claim 1, wherein:

the composite sheet material is formed from layers of resin impregnated material selected from a group consisting of fiberglass, graphite, carbon fibers and aramid fibers.

6. The structural member of claim 1, wherein:

strips of spacing material are interspaced between composite layers of the sheet material to increase the thickness of the sheet material for that portion of the sheet material forming the lip.

7. The structural member of claim 6, wherein:

the spacing material is a composite material.

8. The structural member of claim 1, wherein:

the loading member is metallic.

9. The structural member of claim 1, wherein:

the undercut portion is a groove which extends about the outer periphery of the loading member.

10. The structural member of claim 1, wherein:

the lip is formed on an end of the composite body.

11. The structural member of claim 1, wherein:

the loading member is a flat metal plate with the outer periphery being an edge of the plate; and the body has flat side walls which are perpendicular to the metal plate.

12. The structural member of claim 1, wherein:

the loading member has holes formed therein for receiving fasteners.

13. A joint formed from composite sheet material that can be used without necessitating the penetration of the composite sheet material with fasteners, the joint comprising:

a rigid structural body formed from composite sheet material;

a loading member having an outer periphery and being configured to secure loads thereto, the composite sheet material overlaying the loading member about the outer periphery, and wherein the outer periphery of the loading member has an undercut portion formed therein;

a lip formed from a portion of the composite sheet material which projects into and engages the undercut portion of the outer periphery of the loading member; and a retaining band which is wrapped about the outer periphery of the loading member and the lip, the band maintaining the lip in engagement with the undercut portion of the loading member so that the loading member is securely held in place relative to the sheet material when loads are applied to the loading member so that the loads are transferred through the loading member to the sheet material.

14. The joint of claim 13, wherein:

the retaining band is formed from a plurality of non-metallic collimated windings.

15. The joint of claim 14, wherein:

the windings are selected from a group consisting of fiberglass fibers, carbon fibers, graphite fibers, and aramid fibers.

16. The joint of claim 13, wherein:

the composite sheet material is formed from layers of resin impregnated material selected from a group consisting of fiberglass, graphite, aramid and carbon fibers.

17. The joint of claim 13, wherein:

strips of spacing material are interspaced between composite layers of the sheet material to increase the thickness of the sheet material for that portion of the sheet material forming the lip.

18. The joint of claim 17, wherein:

the spacing material is a composite material.

19. The joint of claim 13, wherein:

the loading member is metallic.

20. The joint of claim 13, wherein:

the undercut portion is a groove which extends about the outer periphery of the loading member.

21. The joint of claim 13, wherein:

the lip is formed on an end of the composite sheet material.

22. The joint of claim 13, wherein:

the loading member is a flat metal plate with the outer periphery being an edge of the plate; and the composite sheet material forms a body having flat side walls which are perpendicular to the metal plate.

23. The joint of claim 13, wherein:

the loading member has holes formed therein for receiving fasteners.

24. A method of applying a load to a rigid structural member formed from composite sheet material comprising:

providing a loading member having an outer periphery and being configured to apply loads thereto, the composite sheet material overlaying the loading member about the outer periphery, and wherein the outer periphery of the loading member has an undercut portion formed therein;

providing a lip formed from a portion of the composite sheet material which projects into and engages the undercut portion of the outer periphery of the loading member so that the load is securely held in place relative to the sheet material; and applying the load to the loading member so that force exerted by the load is transferred from the loading member to the lip of the composite sheet material and the remaining composite sheet material.

* * * * *